US009003204B2

(12) United States Patent
Haerterich et al.

(10) Patent No.: US 9,003,204 B2
(45) Date of Patent: Apr. 7, 2015

(54) OPTIMAL RE-ENCRYPTION STRATEGY FOR JOINS IN ENCRYPTED DATABASES

(71) Applicants: Martin Haerterich, Wiesloch (DE);
Florian Kerschbaum, Karlsruhe (DE);
Patrick Grofig, Karlsruhe (DE);
Mathias Kohler, Stutensee (DE);
Andreas Schaad, Karlsruhe (DE); Axel Schroepfer, Rheinstetten (DE); Walter Tighzert, Heidelberg (DE)

(72) Inventors: Martin Haerterich, Wiesloch (DE);
Florian Kerschbaum, Karlsruhe (DE);
Patrick Grofig, Karlsruhe (DE);
Mathias Kohler, Stutensee (DE);
Andreas Schaad, Karlsruhe (DE); Axel Schroepfer, Rheinstetten (DE); Walter Tighzert, Heidelberg (DE)

(73) Assignee: SAP SE, Walldorf (DE)

( * ) Notice: Subject to any disclaimer, the term of this patent is extended or adjusted under 35 U.S.C. 154(b) by 104 days.

(21) Appl. No.: 13/938,571

(22) Filed: Jul. 10, 2013

(65) Prior Publication Data
US 2015/0019879 A1   Jan. 15, 2015

(51) Int. Cl.
G06F 21/60 (2013.01)
G06F 21/62 (2013.01)

(52) U.S. Cl.
CPC .................................. G06F 21/6218 (2013.01)

(58) Field of Classification Search
None
See application file for complete search history.

(56) References Cited

U.S. PATENT DOCUMENTS

| 6,069,957 | A * | 5/2000 | Richards ........................ 380/281 |
| 6,091,818 | A * | 7/2000 | Campinos et al. ............ 713/155 |
| 7,188,136 | B1 * | 3/2007 | Aoshima et al. ............... 709/203 |
| 2004/0243816 | A1 * | 12/2004 | Hacigumus et al. .......... 713/193 |
| 2013/0159731 | A1 * | 6/2013 | Furukawa ...................... 713/189 |

OTHER PUBLICATIONS

Kerschbaum, et al., "Optimal Re-Encryption Strategy for Joins in Encrypted Databases," SAP Applied Research, 16 pages, 2013.
Bellare et al., "Deterministic and Efficiently Searchable Encryption," In Advances in Cryptology (CRYPTO), 2007, 43 pages.
Binnig et al., "Dictionary-based order-preserving string compression for main memory column stores," In Proceedings of the ACM International Conference on Management of Data (SIGMOD), 2009, 13 pages.
Blaze et al., "Divertible Protocols and Atomic Proxy Cryptography," In Advances in Cryptology (EUROCRYPT), 1998, 18 pages.
Boldyreva et al., "Order-Preserving SymmetricEncryption," In Advances in Cryptology (EUROCRYPT), 2009, 24 pages.
G. D. James, The Representation Theory of the Symmetric Groups, LNM 682, Springer-Verlag, 1978, 168 pages.
Galler, et al., "An Improved Equivalence Algorithm," Presented at the ACM National Conference, vol. 7, No. 5, May 3, 1964, pp. 301-303.

(Continued)

*Primary Examiner* — Benjamin Lanier
(74) *Attorney, Agent, or Firm* — Fish & Richardson P.C.

(57) ABSTRACT

Methods, systems, and computer-readable storage media for selecting columns for re-encryption in join operations. In some implementations, actions include determining a first column and a second column to be joined, receiving a first key corresponding to the first column and a second key corresponding to the second column, receiving a first rank associated with the first key and a second rank associated with the second key, selecting the second column for re-encryption based on the first rank and the second rank, and providing the first column, the second column, and the first key for performing a join operation, the second column being re-encrypted based on the first key.

12 Claims, 3 Drawing Sheets

(56) References Cited

OTHER PUBLICATIONS

Hacigümüs, et al., "Executing SQL over Encrypted Data in the Database-Service-Provider Model," In Proceedings of the ACM International Conference on Management of Data (SIGMOD), 2002, 12 pages.

Pohlig, et al., "An improved algorithm for computing logarithms over GF(p) and its cryptographic significance," IEEE Transactions on Information Theory, vol. 24, No. 1, Jan. 1978, pp. 106-110.

Popa et al., "CryptDB: Protecting confidentiality with Encrypted Query Processing," In Proceedings of the 23rd ACM Symposium on Operating Systems Principles (SOSP), 2011, 16 pages.

Popa, et al., "Cryptographic treatment of CryptDB's Adjustable Join," Technical Report MIT-CSAIL, Mar. 25, 2012, 14 pages.

* cited by examiner

OPTIMAL RE-ENCRYPTION STRATEGY FOR JOINS IN ENCRYPTED DATABASES

BACKGROUND

Encrypted databases provide data protection (security) in cloud platforms and/or database-as-a-service settings. In encrypted databases, data can be encrypted at the client and can be provided to the database for storage. In some examples, the encryption keys are exclusively stored at the client, and queries (operations) to the database are performed over encrypted data.

To execute some queries, e.g., queries including joins, proxy re-encryption (PRE) can be performed, which translates a ciphertext under one key to a ciphertext under another key without knowing either of the keys. Using PRE, the client issues a PRE key to the database. The database uses the PRE key to re-encrypt at least one column involved in the join operation, such that multiple columns in the join operation are encrypted under the same key. This can be referred to as dynamically adjusting the database encryption.

One reason for dynamically adjusting the database encryption to the queries is that PRE can reveal information to an attacker that is observing the database. For example, the attacker could obtain ciphertexts, and that can be used in cryptanalysis of the keys. When the database receives the PRE key, the database chooses a column which to re-encrypt, and chooses the column under an unknown schedule of future operations, e.g. future joins. Naive approaches to column selection can lead to an infinite number of re-encryptions.

SUMMARY

Implementations of the present disclosure include computer-implemented methods for selecting columns for re-encryption in join operations. In some implementations, actions include determining a first column and a second column to be joined, receiving a first key corresponding to the first column and a second key corresponding to the second column, receiving a first rank associated with the first key and a second rank associated with the second key, selecting the second column for re-encryption based on the first rank and the second rank, and providing the first column, the second column, and the first key for performing a join operation, the second column being re-encrypted based on the first key.

In some implementations, actions further include updating data associated with the first column and the second column based on selecting the second column for re-encryption.

In some implementations, updating data is based on a cost associated with the second column.

In some implementations, the cost is based on a number of elements provided in the second column.

In some implementations, updating data includes adding the cost to the first rank, and subtracting the cost from the second rank.

In some implementations, actions further include determining that the second rank is less than the first rank, wherein selecting the second column is performed in response.

In some implementations, the first key includes a cluster key corresponding to a cluster of columns that includes the first column.

In some implementations, the second key includes a cluster key corresponding to a cluster of columns that includes the second column.

In some implementations, actions further include deleting the second key.

In some implementations, actions further include determining that a difference between the second rank and a cost is less than zero, wherein the second key is deleted in response.

In some implementations, the first key includes an encryption key used to encrypt the first column.

In some implementations, the second key includes an encryption key used to encrypt the second column.

In some implementations, the second column is re-encrypted further based on the second key.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to column selection for re-encryption of columns in encrypted databases, e.g., databases that store encrypted data. More particularly, implementations of the present disclosure provide for column selection for re-encryption that results in at most $O(n^{3/2})$ re-encryptions for n columns under any schedule of join operations. Implementations of the present disclosure further provide re-encryption of multiple columns to be joined, which results in a bound of at most $O(n \log n)$ re-encryptions, e.g., where re-encryption of two columns is counted as two re-encryptions.

In general, a design goal of encrypted databases in the database-as-a-service context is to move the encryption layer above the query processing layer. For example, in all query process operators, e.g., select, join, are supposed to work on encrypted data. In this manner, it can be ensured that almost any query can be processed on the encrypted data. In some encrypted databases, special operators are provided for many queries, where post-processing and filtering of queries are required. In some encrypted databases, this was improved, such that database operators remain unchanged, and the existing, commercial database systems could be used for encryption in cloud platforms. Even in view of this improvement, special encryption schemes, e.g., order-preserving encryption, deterministic encryption, can be implemented. Such encryption schemes, however, are not as secure as might be desired. Consequently, and in some examples, only database columns that are necessary for performing queries using such encryption schemes are encrypted. One problem, however, is that it is not always a priori known, which columns will be implicated in future queries. Consequently, the encryption state is to be dynamically adjusted, e.g., on-the-fly, to the queries that are performed.

In some examples, in order to dynamically adjust the encryption to the received queries, so-called onion encryption can be implemented. While it is possible to choose an optimally secure encryption, if all queries are known upfront, i.e., a priori, it is difficult to do so, if any queries are processed on-the-fly. Consequently, and in some examples, each data item can encrypted using onion encryption, and can be dynamically decrypted to the corresponding onion layer in response to received queries. An example, encryption onion can include the following example layers:

L3—Randomized Encryption: provided as IND-CPA secure encryption that allows retrieval using only AES encryption in CBC mode.

L2—Deterministic Encryption: allows processing of equality comparisons, and plaintext always enciphers to the same cipher text.

L1—Order-Preserving Encryption (OPE): allows processing of greater-than comparisons, e.g., using order-preserving symmetric encryption.

L0—Data: the data that is to be encrypted.

In some examples, the layers of the onion represent a strict order, where the lower the layer, the less security is provided, but more operations are supported. For example, the layer L0 is the cleartext data layer, which is the least secure, but the maximum number of operations can be performed. In some examples, each lower layer supports all operations that the next upper layer supports, such that a decryption never needs to be undone.

In some implementations, discussed in further detail below, the client analyzes each query before executing the query, and determines the necessary encryption layer in the onion encryption in the database. In some examples, before sending the query to the database, the client performs decryption of the column(s) implicated in the query to the determined onion layer. Further, no encryption from a lower to a higher encryption layer is ever performed. In this manner, the level (layer) of encryption in the database is dynamically adjusted to the queries processed.

In one example, in order to perform an equi-join operation, data is decrypted to the deterministic layer L2, but different columns may still be encrypted. In this example, proxy re-encryption (PRE) can be performed, in which a proxy translates a ciphertext encrypted under one key into a ciphertext under another key without decrypting the ciphertext. In this manner, the proxy does not learn the plaintext or any of the keys, but the proxy does learn a relation between the keys. Consequently, the security against cryptanalysis is reduced to the secrecy of one key.

Figure 1:
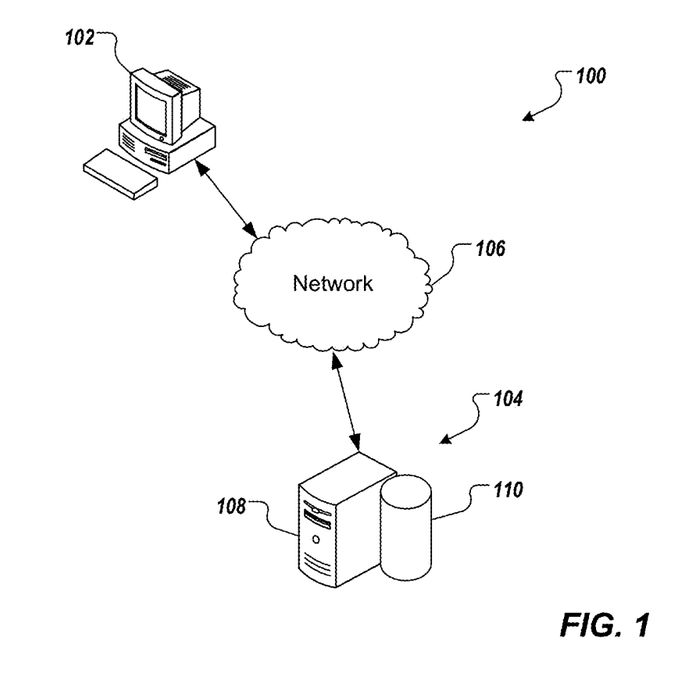
FIG. 1 depicts an example high-level architecture in accordance with implementations of the present disclosure.

Implementations of the present disclosure will be discussed in further detail herein with reference to an example context. FIG. 1 depicts an example high-level architecture 100 in accordance with implementations of the present disclosure. More particularly, the high-level architecture 100 provides the example context, within which implementations of the present disclosure can be realized. It is appreciated that implementations of the present disclosure can be realized in other contexts.

The high-level architecture 100 includes a computing device 102, e.g., client-side, a server system 104 and a network 106. In some examples, the computing device 102 and the server system 104 communicate over the network 106. In accordance with implementations of the present disclosure, the server system 104 can maintain a database that stores encrypted data, e.g., an encrypted database. In some examples, the data is encrypted at the computing device 102, and the encrypted data is sent to the server system 104 over the network 106 for storage. In some examples, the encrypted data is stored in columns, where each column includes a respective encryption key. For example, and as discussed in further detail herein, the encrypted data can be stored in multiple columns, e.g., columns a, b, c, d, e, f each column including an associated encryption key, e.g., $k_a$, $k_b$, $k_c$, $k_d$, $k_e$, $k_f$ stored at the computing device 102.

In some implementations, queries (operations) to the database are performed over the encrypted data. For example, the computing device 102 can submit a query to the server system 104. For example, to perform a selection, e.g. SELECT a FROM b WHERE c=1, the columns for selection, c in the example, can be encrypted using deterministic encryption. In deterministic encryption, a plaintext always enciphers to the same ciphertext. In order to perform a join, e.g. SELECT a.b, c,d FROM a, c WHERE a.e=c.f, the columns for the join (columns e and f in this example) need to be encrypted using the same key. This can be achieved using PRE, introduced above, in which a proxy translates a ciphertext under one key, e.g., $k_a$, to a ciphertext under another key, e.g., $k_b$, without knowing either of the keys. In some examples, the server system 104 performs PRE when required, e.g., when a query is received that includes a join over previously unjoined columns. In some examples, the computing device 102 issues a PRE key to the server system 104, which re-encrypts at least one column of the to-be-joined columns, such that the multiple columns are encrypted under the same key. In this manner, the join operation can be performed as it would on an unencrypted database, without exposing the actual data values to the server system 104.

In some implementations, a proxy re-encryptable, deterministic encryption scheme is used. An example proxy re-encryptable, deterministic encryption scheme includes symmetric Pohlig-Hellman encryption.

For purposes of illustration, p can be provided as the prime order of a group $\mathbb{Z}_p$, and m be an element of $\mathbb{Z}_p$ representing a message that is to be encrypted. In some examples, ord (p) can be the order of the multiplicative group $\mathbb{Z}^*_p$ over $\mathbb{Z}_p$. In some examples, an element k of $\mathbb{Z}_{ord(p)}$ can be uniformly chosen, such that gcd(k,ord(p))=1. In some examples, the element m can be encrypted to the ciphertext c based on the following example relationship:

$$c = m^k \bmod p$$

In some examples, the ciphertext c can be decrypted to the element m based on the following example relationship:

$$m = c^{k^{-1} \bmod ord(p)} \bmod p$$

In these examples, the element k is the secret key.

By way of example, database columns a and b can be considered, and can have respective (different) keys $k_a$ and $k_b$, where both columns are encrypted at the deterministic layer L2. In this example, column a has been selected to be re-encrypted to the key of column b, where the PRE key ($k_{pre}$) can be determined, e.g., by the computing device 102 of FIG. 1, based on the following example relationship:

$$k_{pre} = k_a^{-1} k_b \bmod \operatorname{ord}(p)$$

Using the PRE key, the server system, e.g., the server system 104, can perform the PRE operation. For example, each ciphertext c of column a is re-encrypted to a ciphertext c' using the PRE key based on the following example relationship:

$$c' = c^{k_{pre}} = m^{k_a k_{pre}} = m^{k_a k_a^{-1} k_b \bmod \operatorname{ord}(p)} = m^{k_b} \bmod p$$

Implementations of column selection for re-encryption will be discussed in further detail herein. Initially, a naïve approach to column selection will be discussed to further highlight advantages achieved in accordance with implementations of the present disclosure.

With regard to an example naïve approach, an example database includes n columns a, b, c, and so forth, where each column is initially deterministically encrypted under its own key, e.g., $k_a$, $k_b$, $k_c$, etc. A number of queries can be performed on the example database, where one or more queries implicate join operations. For example:

JOIN(a, b)
JOIN(b, c)

can be provided in a query for first joining columns a and b, and then columns b and c. In some examples, joins with n≥2 columns can be simulated by joining n−1 pairs of columns. However, the order in which the pairs are chosen is not arbitrary. Efficient selection of column pairs in accordance with implementations of the present disclosure is discussed in further detail below.

Continuing with the example naïve approach, in order to perform a join operation, at least one column needs to be re-encrypted. For example:

JOIN(a, b): a←b can indicate that column a is re-encrypted to the key of column b.

In some examples, the order of the columns in the join operation is determined by the query string. Consequently, the database connector chooses the correct column to re-encrypt.

The effect of a few simple, straight-forward column selection strategies that could be implemented in the example naïve approach are discussed in further detail below. This is to highlight that such simple strategies do not result in the best performance. One example strategy is to always use the first column in the query string. To illustrate this, the following example schedule can be provided:

JOIN(a, b): a←b
JOIN(a, c): a←c
JOIN(a, b): a←b
JOIN(a, c): a←c

This example schedule can lead to an infinite number of re-encryptions, and is therefore unadvisable. Instead, a maximum number of re-encryptions for any schedule should be achievable.

Another example strategy can include considering a total order of columns, e.g. lexicographically, where a lower column is always re-encrypted to an upper column. To illustrate this, the following example schedule can be provided:

JOIN(a, b): a←b
JOIN(b, c): b←c
JOIN(a, b): a←c
JOIN(c, d): c←d
JOIN(b, c): b←d
JOIN(a, b): a←d
...

This results in $$\frac{n(n-1)}{2},$$

i.e., $O(n^2)$ re-encryptions. This is sub-optimal, because, for example, the same schedule can be completed with n−1 PREs as follows:

JOIN(a, b): a←b
JOIN(b, c): c←b
JOIN(a, b)
JOIN(c, d): d←b
JOIN(b, c)
JOIN(a, b)
...

Implementations of the present disclosure will now be discussed in view of the above example approaches. In some implementations, columns and keys are stored. In some examples, column objects and/or key objects can be provided as Java objects or C/C++ structures. In some examples, column objects and/or key objects can be stored as database table rows. In some examples, storing objects in database tables enables the objects to be shared between multiple clients of the encrypted database and ensures persistence between different runs of the application of one client.

Accordingly, in a table "Keys," key objects can be stored with each key object including a key identifier (KeyId) and a rank (R). In some examples, the rank is set to an initial value, e.g., 1, and is the same for all key objects. In some examples, the key identifier uniquely identifies a respective key, and can be the primary database key of the table. A table "Columns" can be provided to store column objects with each column object including a column identifier (ColumnId), a cost (C), and a respective KeyId. In some examples, ColumnId uniquely identifies a respective column. In some examples, ColumnId can be provided from the name of the column TABLE.COLUMN, which enables searching using the name. In some examples, ColumnId is the primary key of the table. In some examples, C indicates a cost of re-encrypting a respective column. In some examples, each column can (at least initially) be associated with a uniform cost value, e.g., 1. In some examples, KeyId uniquely identifies the key associated with the respective column, and is a foreign key of the Column table, but a primary key of the Keys table, as discussed above.

Each column of the database can be initialized with its own key, and cost value, e.g., 1. Algorithm 1, below, provides an example initialization:

---
Algorithm 1: Example Initialization
---
function Init
    for all column do
        cost ← 1
        Insert keyId, cost Into Keys
        Insert columnId, cost, keyId Into Columns
    end for
end function

---

When uploading the encrypted data into the database, the data of each column is encrypted on the client-side, e.g., the computing device 102 of FIG. 1, under its associated key. Subsequently, queries can be performed on the encrypted data, which queries can include optional joins, as discussed herein.

When a query is to be performed, parameters are encrypted and return values are decrypted. To achieve this, the corresponding key(s) are retrieved from the keys table for the implicated columns. Algorithm 2, below, provides an example key retrieval:

---
Algorithm 2: Example Key Retrieval
---
function GetKey(column)
    return Select keyId From Columns Where columnId = column
end function
---

When performing a join between columns, e.g., columns a and column b, one of the multiple columns is selected for re-encryption. Algorithm 3, below, provides an example column selection in accordance with implementations of the present disclosure:

---
Algorithm 3: Column Selection for Re-Encryption
---
function Join(columnA, columnB)
    keyA ← GetKey(columnA)
    keyB ← GetKey(columnB)
    if keyA = keyB then
        return null
    end if
    rankA ←Select rank From Keys Where keyId = keyA
    rankB ←Select rank From Keys Where keyId = keyB
    if rankA > rankB then
        lower ←columnB
        (lowerKey, lowerRk)← (keyB; rankB)
        (upperKey, upperRk)← (keyA; rankA)
    else
        lower ←columnA
        (lowerKey, lowerRk) ← (keyA; rankA)
        (upperKey, upperRk) ← (keyB; rankB)
    end if
    lowerCost ←Select cost From Columns Where columnId = lower
    Update Keys Set rank = lowerRk − lowerCost Where keyId = lowerKey
    Update Keys Set rank = upperRk + lowerCost Where keyId = upperKey
    Update Columns Set keyId = upperKey Where columnId = lower
    if lowerRank − lowerCost = 0 then
        Delete From Keys Where keyId = lowerKey
    end if
    return lower
end function
---

In accordance with the column selection of Algorithm 3, the column is selected based on the rank of the keys, and the respective column object is updated to indicate the new key. More particularly, the column with the lower ranking key is selected for re-encryption. That is, the key associated of the higher ranking column is used to re-encrypt the selected column. The non-selected column, i.e., the column that is not re-encrypted, can be referred to as the "steady" column. Afterward, the cost of the selected column is added to the rank of the key associated with the non-selected column, i.e., the key used to re-encrypt the selected column, and the cost of the selected column is subtracted from the rank of the key of the selected column, i.e., the key that was not used for re-encryption. In this manner, the rank of the key associated with the non-selected column is increased, and the rank of the key associated with the selected column is decreased. In some examples, if the rank of a key reaches a minimum value, e.g., 0, the key can be deleted from the Keys table, because the key can no longer be used to encrypt any column.

In some implementations, it can be noted that, for any schedule of joins, even an infinite schedule of joins, the column selection of the present disclosure leads to a finite number of PREs. That is, the column selection of the present disclosure returns a value that is different from "null" only a finite number of times. This can be illustrated through a variant of Algorithm 3, which omits the deletion of keys having a rank equal to or less than the minimum value, e.g., zero. In this variant, the sum of the absolute values of differences of the ranks over all pairs of keys is a non-negative integer that is bounded (by n/2 times the maximum possible rank), and that increases by at least 2 with each re-encryption.

In accordance with implementations of the present disclosure, only the selected column is joined, as opposed to the multiple columns. This reduces the cost for each join operation, because one column is re-encrypted, as opposed to multiple columns, but does not increase the worst-case cost, e.g., due to the re-encryption of columns in shrinking groups. In this manner, it is provided that Algorithm 3 needs at most $t(n) \leq 2n^{3/2}$ re-encryptions, where n is the number of columns and t(n) is the maximum number of re-encryptions that can be performed, the maximum being taken over all possible schedules of join operations. This bound is optimal in the sense that the asymptomatic behavior of t(n) is $O(n^{3/2})$.

In accordance with implementations of the present disclosure, column selection can be enhanced to improve worst case behavior. To provide context, a key that is neither of the two columns implicated in a join operation, but is associated with a third column, is generally not a viable option. While this may decrease the overall cost, it may also decrease security. To illustrate this, the following example join schedule can be considered:

JOIN(e, c): e←c
    JOIN(d, c): d←c
    JOIN(a, b): a←c, b←c If this example join schedule continues with JOIN(b, c) and JOIN(a, c), the overall cost is optimal, but the operation is speculative in terms of security. For example, if the schedule continues, the adversary is given more information. That is, all columns are encrypted under the same key, and the adversary can use this information for cryptanalysis.

In an alternative join schedule, the third join operation can be replaced with JOIN(a, b): a←b, such that there are two remaining, disjoint keys: one for c, d, e, and one for a, b. This complicates cryptanalysis. Choosing one of the two keys of the joined columns always yields the minimal amount of ciphertexts for cryptanalysis, because at least one re-encryption is necessary in order to perform the join.

In view of this context, column selection in accordance with implementations of the present disclosure can be enhanced by only considering certain types of column selection algorithms. In some examples, a column selection algorithm is only admissible (usable), if the column selection algorithm guarantees that two columns have different keys, unless there is a chain of previous joins that links the two columns. Accordingly, columns not grouped by the fact that they share a common key, but by the fact that there is a chain of previous join operations that links one column to another.

In some examples, to make this distinction, a cluster of columns (at any given time) is provided and includes the set of columns that are connected with respect to previous joins. In some examples, each cluster is provided as a union of groups. In some implementations, a cluster key can be provided as the (common) key of the largest group in a cluster.

In some implementations, enhancement of the column selection can be achieved by modifying the data structures and algorithms to be able to account for cluster keys. In some examples, an additional column ClusterKeyId can be included in the Columns table, and stores the identifier of key associated to the cluster that the column belongs to. During initialization, Algorithm 1 above, the cluster key of a column gets the same value as the key. For example, the following example statement can be provided in Algorithm 1:

Insert columnId, cost, keyId, keyId Into Columns

In some examples, another algorithm, similar to Algorithm 2 above, defines a function GetClusterKey to extract the ClusterKeyId for a column.

Algorithm 4, below, provides an example enhanced column selection in accordance with implementations of the present disclosure:

---

Algorithm 4: Enhanced Column Selection for Re-Encryption

---

```
function Join2(columnA, columnB)
    if GetKey(columnA) = GetKey(columnB) then
        return null
    end if
    keyA←GetClusterKey(columnA)
    keyB←GetClusterKey(columnB)
    rankA←Select rank From Keys Where keyId = keyA
    rankB←Select rank From Keys Where keyId = keyB
    if rankA > rankB then
        lower←columnB
        (lowerKey; lowerRk)←(keyB; rankB)
        upper←columnA
        (upperKey; upperRk)←(keyA; rankA)
    else
        lower←columnA
        (lowerKey; lowerRk)←(keyA; rankA)
        upper←columnB
        (upperKey; upperRk)←(keyB; rankB)
    end if
    lowerCost←Select Sum(cost) From Columns Where clusterKeyId =
lowerKey
    Update Keys Set rank = lowerRk−lowerCost Where keyId =
lowerKey
    Update Keys Set rank = upperRk+lowerCost Where keyId =
upperKey
    Update Columns Set keyId = upperKey Where columnId = lower
    Update Columns Set clusterKeyId = upperKey Where
clusterKeyId = lowerKey
    if lowerRank−lowerCost = 0 then
        Delete From Keys Where keyId = lowerKey
    end if
    if GetKey(upper) = GetClusterKey(upper) then
        return lower
    end if
    Update Columns Set keyId = upperKey Where columnId = upper
    return (lower, upper)
end function
```

---

The main difference of the enhanced column selection, Algorithm 4, is that two columns, both of which are to be re-encrypted, can be returned. By keeping track of the cluster a column belongs to, both columns of a join can be re-encrypted using a key that they will eventually have anyway without degrading the security.

Implementations of the present disclosure further address multiple, simultaneous joins. An example query that results in multiple, simultaneous joins can be provided as:

SELECT a.b, c.d, e.f FROM a, c, e WHERE a.w=c.x AND b.y=c.z

In some implementations, such queries can be resolved by joining pairs of columns one after the other. More specifically, given a group of k columns that are to be compared, the column corresponding to a key with the highest occurring rank can be chosen. Pairs of columns can be defined, each pair including the chosen column and a respective other column. Because implementations of the present disclosure encrypt towards the higher rank, this ensures that all columns have the same key as the chosen column after k−1 executions. The number of proxy re-encryptions is bounded by k−1 for the column selection for re-encryption (Algorithm 3), and by k for the enhanced column selection for re-encryption (Algorithm 4), because each of the columns is re-encrypted at most once.

As introduced above, implementations of the present disclosure also provide non-uniform costs for each column. For example, some columns may be easier to re-encrypt than others. In some examples, the re-encryption cost is linearly related to the number of elements per column. This means, for example, that it is easier to re-encrypt two columns of size 1 and 2, respectively, than it is to re-encrypt one column of size 4.

In some implementations, non-uniform costs can be incorporated. In some examples, the non-uniform costs are provided based on size of the column, e.g., the number of elements in a column. In some examples, each column can be initialized with a respective cost, e.g., in Algorithm 1 above. This can lead to a significant reduction in computation costs.

Following the example above, consider columns a, b and c of respective sizes 2, 1 and 4, and the following example join schedule:

JOIN(a, b)
JOIN(c, a)

In view of this example join schedule, uniform costs can suggest the following re-encryptions: a←b, and c←a. This results in 6 element re-encryptions, which is the worst possible performance for any set of re-encryptions given this example. Instead, non-uniform costs using column sizes provide the following re-encryptions: b←a, a←c. This results in 3 element re-encryptions. Furthermore, the maximum number of element re-encryptions is 4 in this example. This is also the minimum worst-case cost under any schedule of join operations.

Accordingly, using non-uniform costs, the best worst-case cost assuming any future schedule of join operations can be achieved. To illustrate this, a column with a non-uniform cost of X can be described as a group of X columns with a non-uniform cost of 1 that always operate successively. If N is provided as the sum of the costs of all columns, costs of at most $O(N \log N)$ can be incurred.

In some examples of non-uniform costs, however, too many re-encryptions for a specific schedule might be performed. This can result in sub-optimal costs, because the future join schedule is unknown. To illustrate this, columns a, b, c and d, with respective sizes 1, 5, 2 and 3, and the following example join schedule can be considered:

JOIN(a, b): a←b
JOIN(c, d): c←d
JOIN(a, c)

In the third join, implementations of the present disclosure dictate c←a, which results in 5 element re-encryptions. This leads to the minimal costs of 5 for a future JOIN(b, c). However, if there is no such future join, costs are not optimal. Instead, and in this example, it would be more efficient to re-encrypt as a←c, resulting in a cost of 4 element re-encryptions. Choosing to re-encrypt as a←c will increase the worst-case cost under many future join schedules. Consequently, the worst-case cost can be optimized where the bound is tight.

It can be further noted that the number of elements in a column may vary. For example, rows may be inserted or deleted. In view of this, and in some examples, non-uniform costs can be fixed. For example, the non-uniform cost of each column can be provided as a fixed value based on an original number of elements in a respective column, e.g., before any join operations are performed.

Figure 2:
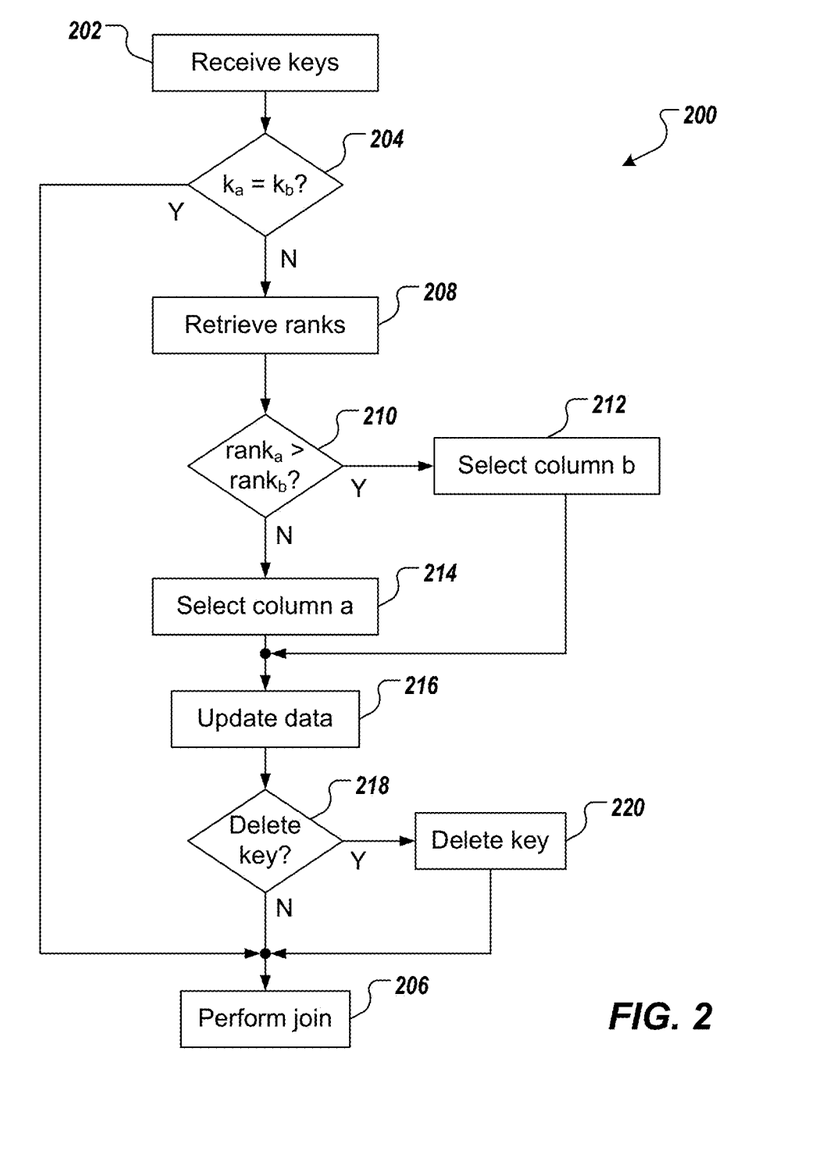
FIG. 2 depicts an example process that can be executed in accordance with implementations of the present disclosure.

FIG. 2 depicts an example process 200 that can be executed in accordance with implementations of the present disclosure. In some examples, the example process 200 can be provided as one or more computer-executable programs executed using one or more computing devices.

Keys are received (202). For example, a first key ($k_a$) corresponding to a first column (column a) is received, and a second key ($k_b$) corresponding to a second column (column b) is retrieved. For example, the keys can be provided from a Keys table. In some examples, the keys include keys that had been used to encrypt the respective columns. That is, for example, $k_a$ had been used to encrypt column a, and $k_b$ had been used to encrypt column b. In some examples, the keys include cluster keys, each cluster key being associated with a group, the columns being associated with respective groups. That is, for example, $k_a$ is a cluster key that is associated with a cluster of columns that column a is included in, and $k_b$ is a cluster key that is associated with a cluster of columns that column b is included in.

It is determined whether the keys are the same (204). If the keys are the same, a join operation is performed based on the columns (206). If the keys are not the same, respective ranks associated with the keys are retrieved (208). For example, the ranks can be retrieved from the Keys table. It is determined whether the rank of one key, e.g., $k_a$, is greater than the rank of the other key, e.g., $k_b$, (210). If it is determined that the rank of the first key is greater than the rank of the second key, the second column is selected for re-encryption (212). If it is determined that the rank of the first key is not greater than the rank of the second key, the first column is selected for re-encryption (214).

After selection of a column, data is updated (216). More specifically, the cost of the selected column is added to the rank of the key associated with the non-selected column, i.e., the key used to re-encrypt the selected column, and the cost of the selected column is subtracted from the rank of the key of the selected column, i.e., the key that was not used for re-encryption. In this manner, the rank of the key associated with the non-selected column is increased, and the rank of the key associated with the selected column is decreased. These values are updated in the respective tables, e.g., Keys table, Columns table.

It can be determined whether a key is to be deleted (218). For example, it can be determined whether the key associated with the selected column is to be deleted. In some examples, if the rank of the key associated with the selected column reaches a minimum value, e.g., 0, the key can be deleted from the Keys table, because the key can no longer be used to encrypt any column. If it is determined that the key is to be deleted, the key is deleted (220). A join operation is performed base on the columns (206). In some examples, the join operation includes re-encryption of the selected column using the key associated with the non-selected column.

Figure 3:
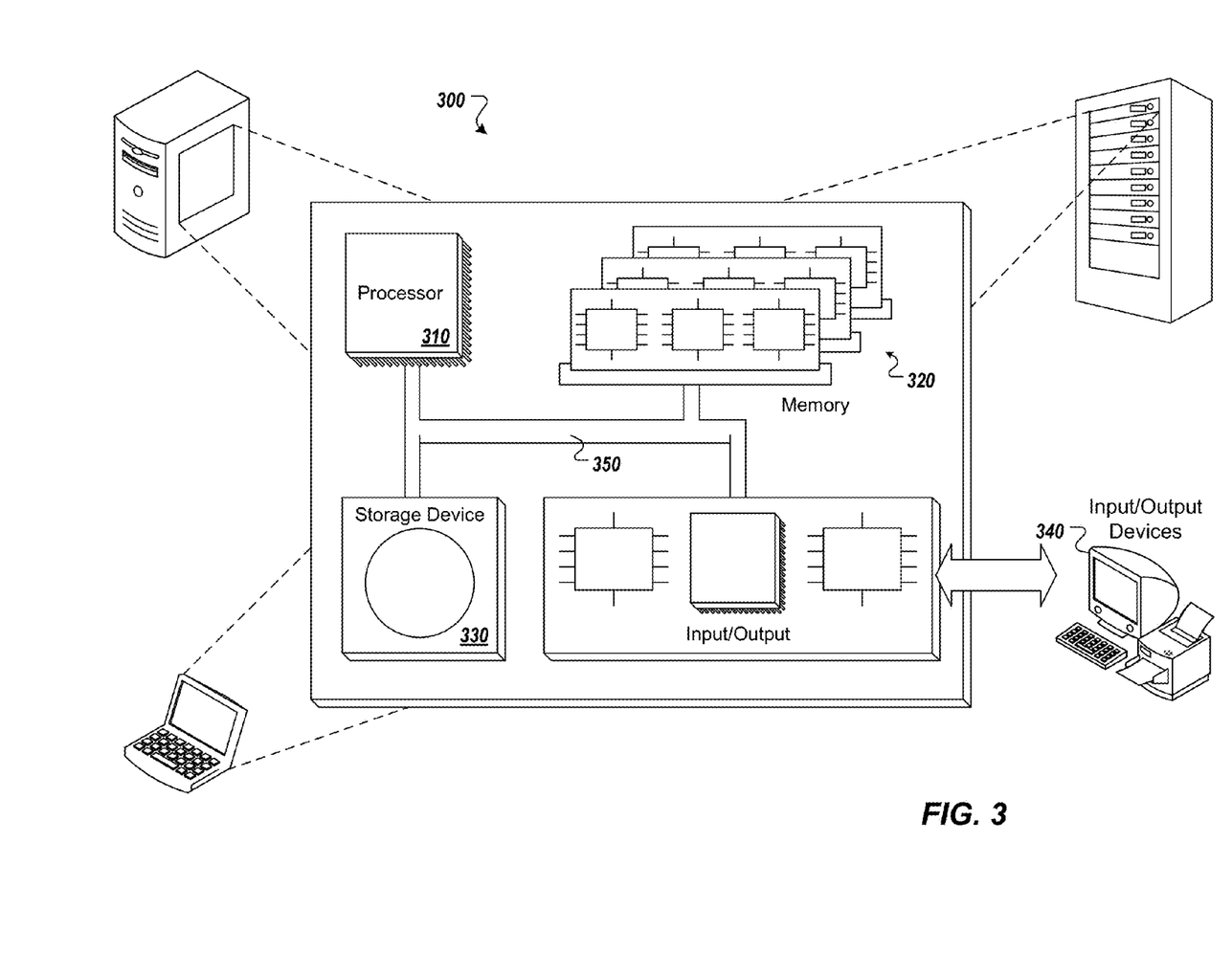
FIG. 3 is a schematic illustration of example computer systems that can be used to execute implementations of the present disclosure.

Referring now to FIG. 3, a schematic diagram of an example computing system 300 is provided. The system 300 can be used for the operations described in association with the implementations described herein. For example, the system 300 may be included in any or all of the server components discussed herein. The system 300 includes a processor 310, a memory 320, a storage device 330, and an input/output device 340. The components 310, 320, 330, 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit. The storage device 330 is capable of providing mass storage for the system 300. In one implementation, the storage device 330 is a computer-readable medium. In various different implementations, the storage device 330 may be a floppy disk device, a hard disk device, an optical disk device, or a tape device. The input/output device 340 provides input/output operations for the system 300. In one implementation, the input/output device 340 includes a keyboard and/or pointing device. In another implementation, the input/output device 340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for selecting columns for re-encryption in join operations, the method being executed using one or more processors and comprising:
    determining, by the one or more processors, a first column and a second column to be joined;
    receiving, by the one or more processors, a first key corresponding to the first column and a second key corresponding to the second column;
    receiving, by the one or more processors, a first rank associated with the first key and a second rank associated with the second key;
    selecting, by the one or more processors, the second column for re-encryption based on the first rank and the second rank;
    updating data associated with the first column and the second column based on selecting the second column for re-encryption and based on a cost associated with the second column, updating data comprising:
        adding the cost to the first rank, and
        subtracting the cost from the second rank; and
    providing, by the one or more processors, the first column, the second column, and the first key for performing a join operation, the second column being re-encrypted based on the first key.

2. The method of claim 1, wherein the cost is based on a number of elements provided in the second column.

3. The method of claim 1, further comprising determining that the second rank is less than the first rank, wherein selecting the second column is performed in response.

4. The method of claim 1, wherein the first key comprises a cluster key corresponding to a cluster of columns that includes the first column.

5. The method of claim 1, wherein the second key comprises a cluster key corresponding to a cluster of columns that includes the second column.

6. The method of claim 1, further comprising deleting the second key.

7. The method of claim 6, further comprising determining that a difference between the second rank and a cost is less than zero, wherein the second key is deleted in response.

8. The method of claim 1, wherein the first key comprises an encryption key used to encrypt the first column.

9. The method of claim 1, wherein the second key comprises an encryption key used to encrypt the second column.

10. The method of claim 1, wherein the second column is re-encrypted further based on the second key.

11. A non-transitory computer-readable storage medium coupled to one or more processors and having instructions stored thereon which, when executed by the one or more processors, cause the one or more processors to perform operations for selecting columns for re-encryption in join operations, the operations comprising:
    determining a first column and a second column to be joined;
    receiving a first key corresponding to the first column and a second key corresponding to the second column;
    receiving a first rank associated with the first key and a second rank associated with the second key;
    selecting the second column for re-encryption based on the first rank and the second rank;
    updating data associated with the first column and the second column based on selecting the second column for re-encryption and based on a cost associated with the second column, updating data comprising:
        adding the cost to the first rank, and
        subtracting the cost from the second rank; and
    providing the first column, the second column, and the first key for performing a join operation, the second column being re-encrypted based on the first key.

12. A system, comprising:
    a computing device; and
    a computer-readable storage device coupled to the computing device and having instructions stored thereon which, when executed by the computing device, cause the computing device to perform operations for selecting columns for re-encryption in join operations, the operations comprising:
        determining a first column and a second column to be joined;
        receiving a first key corresponding to the first column and a second key corresponding to the second column;
        receiving a first rank associated with the first key and a second rank associated with the second key;
        selecting the second column for re-encryption based on the first rank and the second rank;
        updating data associated with the first column and the second column based on selecting the second column for re-encryption and based on a cost associated with the second column, updating data comprising:
            adding the cost to the first rank, and
            subtracting the cost from the second rank; and
        providing the first column, the second column, and the first key for performing a join operation, the second column being re-encrypted based on the first key.

* * * * *